(12) United States Patent
Golberg

(10) Patent No.: US 10,938,145 B2
(45) Date of Patent: Mar. 2, 2021

(54) SYSTEMS AND METHODS FOR SEALING MOTOR LEAD EXTENSIONS

(71) Applicant: Baker Hughes, a GE company, LLC, Houston, TX (US)

(72) Inventor: Ilya Golberg, Oklahoma City, OK (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 16/571,987

(22) Filed: Sep. 16, 2019

(65) Prior Publication Data

US 2020/0091652 A1 Mar. 19, 2020

Related U.S. Application Data

(60) Provisional application No. 62/732,233, filed on Sep. 17, 2018.

(51) Int. Cl.
| | |
|---|---|
| *H01R 13/523* | (2006.01) |
| *H01R 13/52* | (2006.01) |
| *E21B 43/12* | (2006.01) |
| *H02K 5/132* | (2006.01) |
| *H02K 5/22* | (2006.01) |
| *E21B 17/02* | (2006.01) |

(52) U.S. Cl.
CPC ......... *H01R 13/523* (2013.01); *E21B 17/028* (2013.01); *E21B 43/128* (2013.01); *H01R 13/521* (2013.01); *H01R 13/5208* (2013.01); *H01R 13/5221* (2013.01); *H02K 5/132* (2013.01); *H02K 5/225* (2013.01)

(58) Field of Classification Search
CPC ............ H01R 13/5205; H01R 13/5208; H01R 13/5219; H01R 13/5221; H01R 13/521; H01R 13/523; H01R 13/533; E21B 17/023; E21B 17/025; E21B 33/1208
See application file for complete search history.

(56) References Cited

U.S. PATENT DOCUMENTS

| | | | | |
|---|---|---|---|---|
| 4,679,875 A | * | 7/1987 | Ramsey | ............... H01R 13/523 439/276 |
| 6,676,447 B1 | * | 1/2004 | Knox | .................. H01R 13/523 439/274 |
| 8,398,420 B2 | | 3/2013 | Watson | |
| 8,512,074 B2 | | 8/2013 | Frey | |
| 9,673,558 B2 | * | 6/2017 | Frey | ..................... H01R 13/512 |

(Continued)

*Primary Examiner* — Tho D Ta
(74) *Attorney, Agent, or Firm* — Sprinkle IP Law Group

(57) ABSTRACT

Systems and methods for sealing a pothead connection to prevent external fluids from leaking into an ESP motor. In one embodiment, a pothead housing has a set of sealing assemblies, where each of the sealing assemblies has a sealing body that is positioned in a port of the motor's housing to form a direct seal against both a corresponding motor lead extension cable and the motor housing. The sealing assembly has a pothead terminal that is electrically connected to the conductor of the corresponding cable. When the pothead is secured to the motor housing, the pothead terminal engages a corresponding motor housing terminal positioned in the port. The motor housing terminal is connected to the motor windings, so this electrically connects the motor lead to the windings. An insulator is positioned to electrically isolate the motor housing terminal from the housing itself.

15 Claims, 9 Drawing Sheets

(56) References Cited

U.S. PATENT DOCUMENTS

| | | | |
|---|---|---|---|
| 10,243,295 B2 * | 3/2019 | Matlack | F04D 29/086 |
| 2008/0064269 A1 * | 3/2008 | Parmeter | H01R 13/521 |
| | | | 439/733.1 |
| 2009/0269956 A1 * | 10/2009 | Frey | H01R 13/533 |
| | | | 439/275 |
| 2010/0167582 A1 * | 7/2010 | Watson | E21B 17/023 |
| | | | 439/589 |
| 2018/0094492 A1 | 4/2018 | Knapp et al. | |
| 2018/0202271 A1 | 7/2018 | Semple | |

* cited by examiner

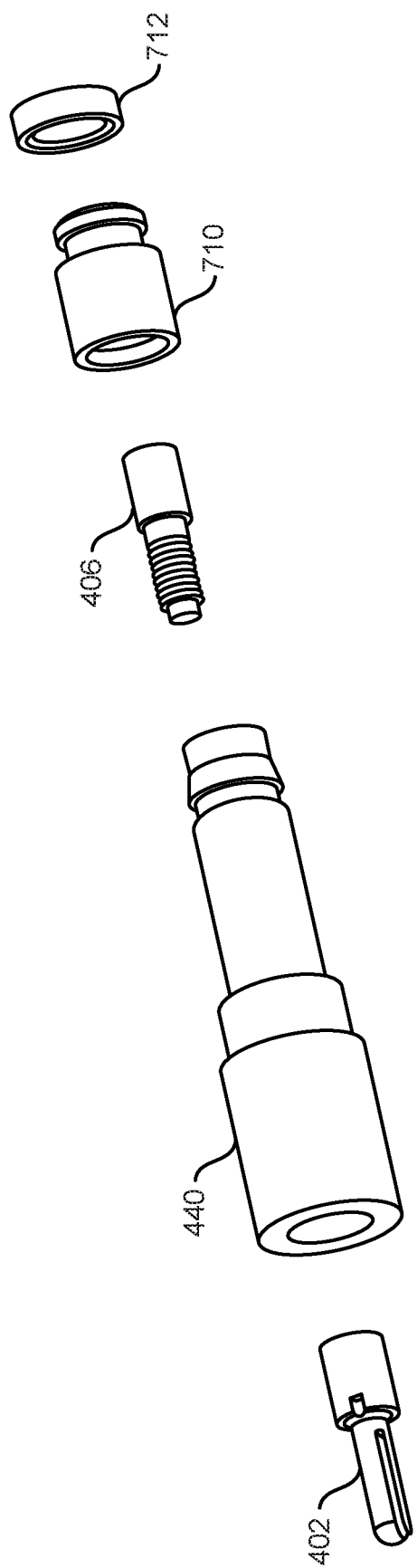

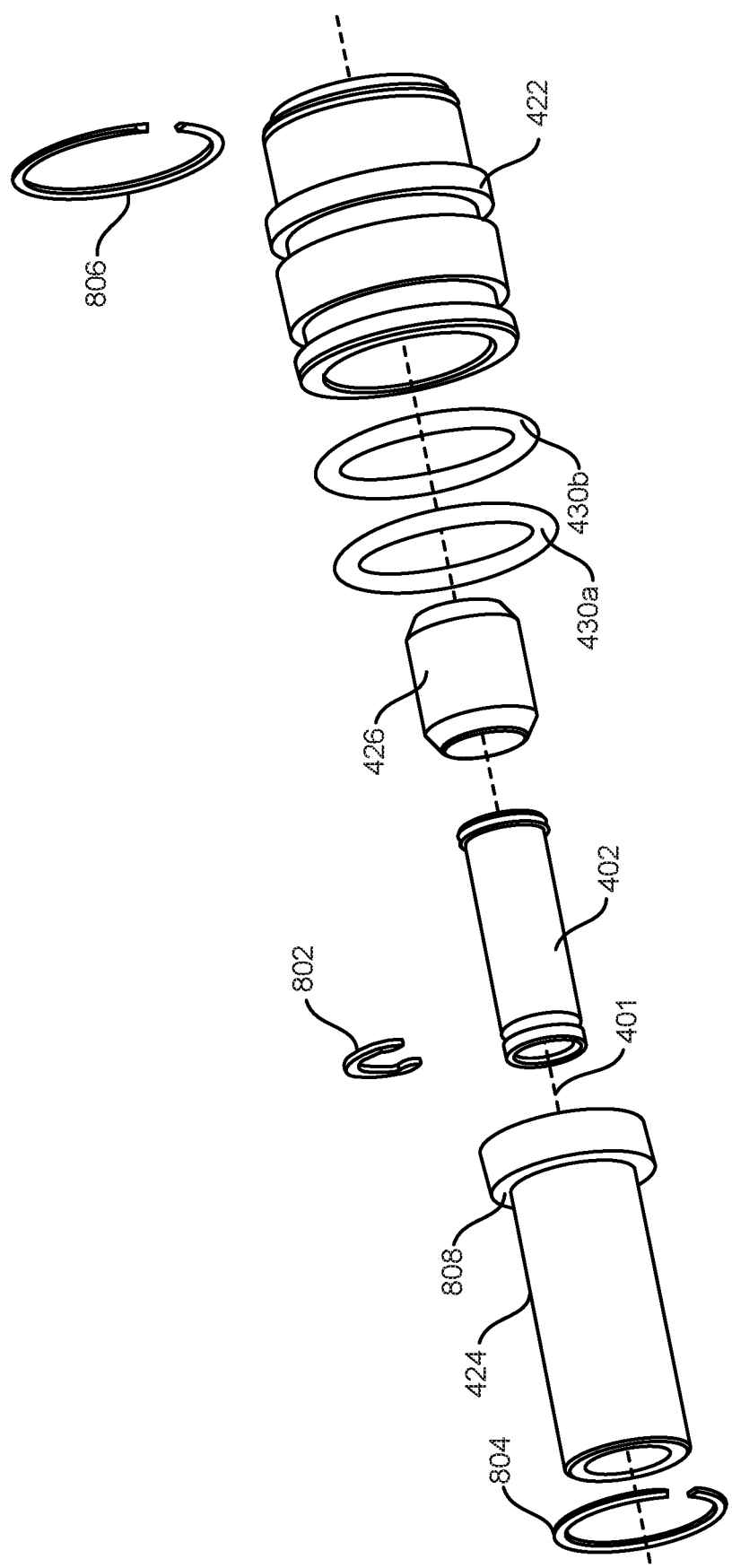

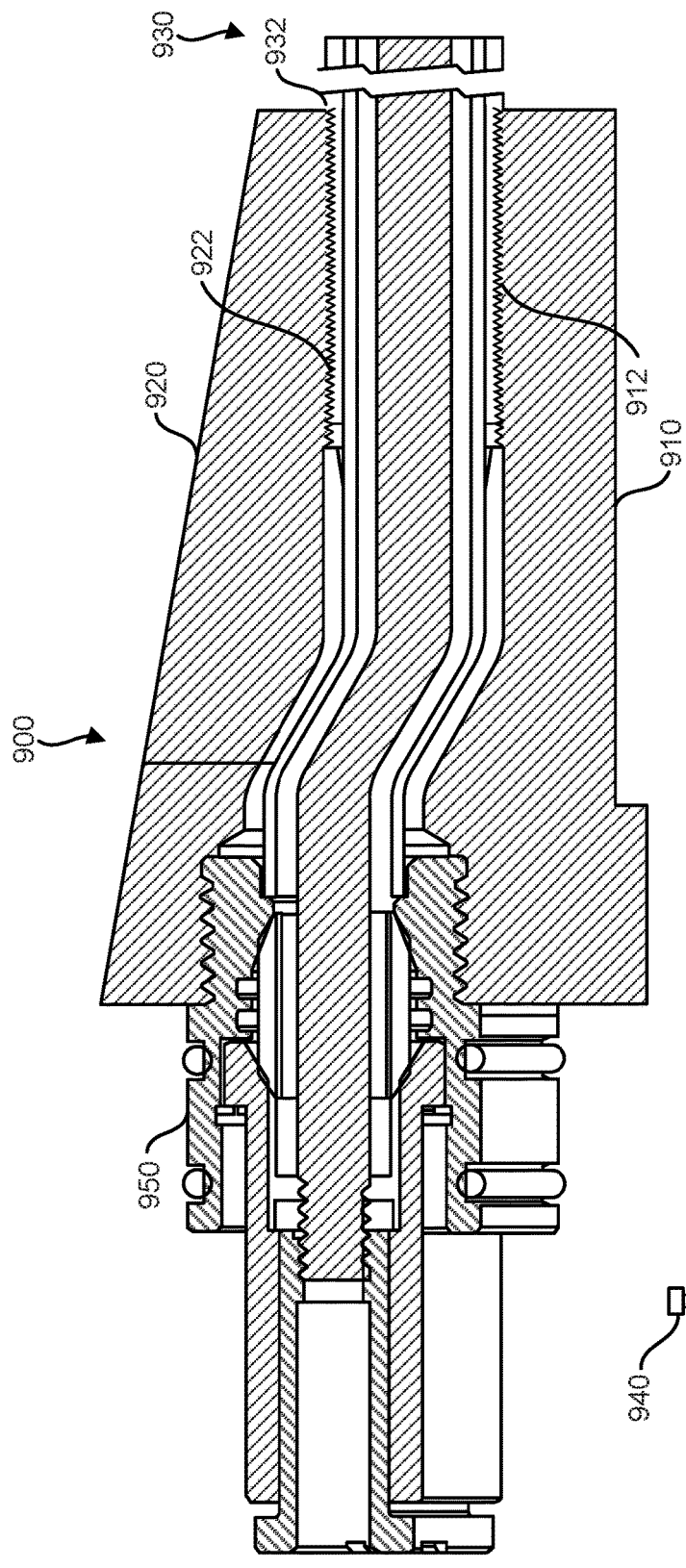
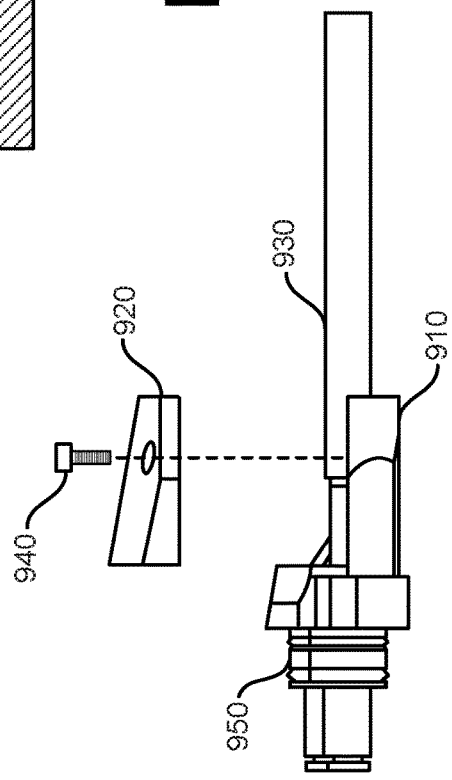
FIG. 9A
FIG. 9B

SYSTEMS AND METHODS FOR SEALING MOTOR LEAD EXTENSIONS

CROSS-REFERENCE TO RELATED APPLICATIONS

This application is a conversion of, and claims a benefit of priority from Provisional Application No. 62/732,233, filed Sep. 17, 2018, entitled "SYSTEMS AND METHODS FOR SEALING MOTOR LEAD EXTENSIONS".

BACKGROUND

Field of the Invention

The invention relates generally to power subsystems for downhole equipment such as electrical submersible pumps (ESP's), and more particularly to means for maintaining a seal at an electrical connection through the housing of a piece of downhole equipment such as a motor for an ESP.

Related Art

Downhole equipment such as an ESP is commonly installed in wells for purposes of producing fluids (e.g., oil) from the wells. Power suitable to drive the equipment is produced at the surface of the wells and is delivered to the equipment via power cables that extend into the wells. The power cables are typically connected to the downhole equipment via "pothead" connectors that couple the power cable to the downhole equipment.

The environment downhole in a well may be very harsh. For instance, the temperature may be several hundred degrees, the fluids in the well may be corrosive, and particles in the fluids may be abrasive. These conditions can cause the components of an ESP system to degrade and possibly fail, thereby shortening the useful life of the ESP system.

A particular area of concern is the set of seals used in the pothead connector. In a conventionally designed pothead connector for an ESP motor, there are three sets of seals: one between the conductor and the insulating block; one between the insulating block and the connector housing; and one between the connector housing and the motor housing. Each of these seals presents a potential point of failure. If any one of the seals fails, fluid exterior to the motor housing can leak through the failed seal and into the motor. This can, in turn, affect the operation of the motor, resulting in a failure or shortened lifespan.

It would be desirable to provide improved means for providing seals in electrical junctions that reduce the likelihood of a failure that would allow external fluids to enter the motor housing.

SUMMARY

This disclosure is directed to systems and methods for reducing the likelihood of a leak in a pothead connection for an ESP motor or other downhole equipment by reducing the number of seals that are required in the pothead connection. More specifically, embodiments of the present invention provide connections in which an insulator component of a pothead connector seals directly to the motor housing, rather than sealing to a pothead housing, which must then be sealed to the motor housing. In an exemplary embodiment, the present pothead connection uses a pothead connector that protects and positions conductors broken out from a power cable. The connector has a housing with three sealing assemblies attached to it. Each sealing assembly is connected to one of the conductors which is anchored to the housing and is independently sealed to a motor head. The pothead housing is not sealed, but is instead open to well fluid. The motor head has three separate insulated connector assembly inserts housed in three separate bores in the motor head. The inserts are connected to separate leads inside the motor head.

In traditional pothead connection assemblies, there are usually three sealing points. The cable has to be sealed to an insulator block, the insulator block has to be sealed to the pothead housing, and the pothead housing has to be sealed to the motor head (motor housing). In embodiments described herein, the seal between the insulating block and pothead housing is eliminated and a seal is instead created between the insulating block and the motor head. This eliminates a common point of failure for the connection system. Furthermore, this configuration allows the full sealing assemblies for the three separate conductors to be contained within three separate bores in the motor head. If one of the seals were to fail (e.g., either the O-ring seal or the football seal), the failure would be limited to one conductor (one phase), and the system would be able to continue operating in a two phase state for some time. Furthermore, using three identical separate sub-assemblies for the three different conductors allows easy reconfiguration of the pothead to meet different form factor requirements (e.g., arrangement of the conductors and sealing subassemblies). Still further, if the sealing mechanism sub-assemblies are moved as a result of changes to the pothead housing, such changes would not affect the sealing mechanisms, so re-design of the sealing elements would not be required, and validation would be simplified. Additionally, the use of three identical easy-to-machine components in place of one larger, difficult-to-machine component allows lower component prices to be achieved.

One embodiment of a pothead connection comprises a pothead housing and a motor housing. The pothead housing has a set of sealing assemblies secured to it, with each of the sealing assemblies being secured to a corresponding cable of a set of motor lead extensions. Each of the sealing assemblies includes a sealing body having a pothead terminal that is electrically connected to a conductor of the corresponding cable. The sealing assembly is directly sealed against the corresponding cable. The motor housing has one or more ports through it from the interior of the housing to its exterior. Each port has a corresponding motor housing terminal positioned in it, where the motor housing terminal is configured to be electrically connected to a corresponding one of the pothead terminals. When the pothead is coupled to the motor housing, the sealing body for each of the sealing assemblies of the pothead connector is sealed directly against the motor housing. Because the sealing body is sealed directly against the motor housing and directly against the cable, it is not necessary to seal the pothead housing against the motor head as in conventional pothead connections.

The sealing bodies may comprise generally cylindrical insulators that are sealed directly against the cable and against the motor head. The sealing bodies may alternatively comprise electrically conductive bodies that are sealed directly against an outer layer of the cable (e.g., a layer of insulating material), as well as against the motor head. In one embodiment, each of the sealing assemblies includes: a front insulator that is threadably connected to the sealing body, where the pothead terminal is positioned within the front insulator. A football seal may be positioned between opposing tapered faces of the front insulator and the sealing body, such that the tapered faces of the front insulator and the sealing body compress the football seal axially, forcing the seal to make secure contact with the cable and the sealing body to form a fluid seal between them. Each of the sealing assemblies may be a separate, but identical assembly, with each of the sealing assemblies being installed in a corresponding, separate port in the motor housing. The pothead connection may also include one or more motor housing insert assemblies. The motor housing terminals are secured within the insert assemblies, and the insert assemblies are installed in corresponding ones of the ports in the motor head. In one embodiment, each of the motor housing insert assemblies has an insert insulator, such that when the motor housing insert assembly is installed in the corresponding port in the motor housing, the insert insulator is positioned between the corresponding motor housing terminal and the motor housing, thereby electrically insulating the terminal from the motor housing. Because the sealing bodies form seals against the cables and motor housing, the interior of the pothead housing may be in fluid communication with well fluids external to the motor housing.

An alternative embodiment may comprise a system for connecting motor lead extensions to windings in a electric submersible pump (ESP) motor. In this embodiment, a pothead connector is coupled to one or more motor lead extension cables, and the pothead connector is secured to an ESP motor to electrically connect the conductors of the motor lead extension cables to the motor's windings within the housing. The pothead housing has a set of sealing assemblies secured to it, with each of the sealing assemblies being secured to a corresponding cable of a set of motor lead extensions. Each of the sealing assemblies includes a sealing body having a pothead terminal that is electrically connected to a conductor of the corresponding cable. The sealing assembly is directly sealed against the corresponding cable. The motor housing has one or more ports through it from the interior of the housing to its exterior. Each port has a corresponding motor housing terminal positioned in it, where the motor housing terminal is configured to be electrically connected to a corresponding one of the pothead terminals. When the pothead is coupled to the motor housing, the sealing body for each of the sealing assemblies of the pothead connector is sealed directly against the motor housing. When the pothead connector is installed on the motor housing, the sealing body of each sealing assembly is sealed directly against the motor housing as well as the corresponding cable, which prevents fluid communication between the interior of the motor housing and the exterior of the housing.

While specific exemplary embodiments of the invention are described in detail below, numerous alternative embodiments are also possible.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 7 is an exploded view of an insulated connection insert assembly in accordance with an exemplary embodiment.

FIG. 8 is an exploded view of a cable sealing assembly in accordance with an exemplary embodiment.

FIG. 9A shows a cross-sectional view of the pothead connector, and FIG. 9B shows an external view of the pothead connector with the two pieces of the housing disassembled.

Figure 1:
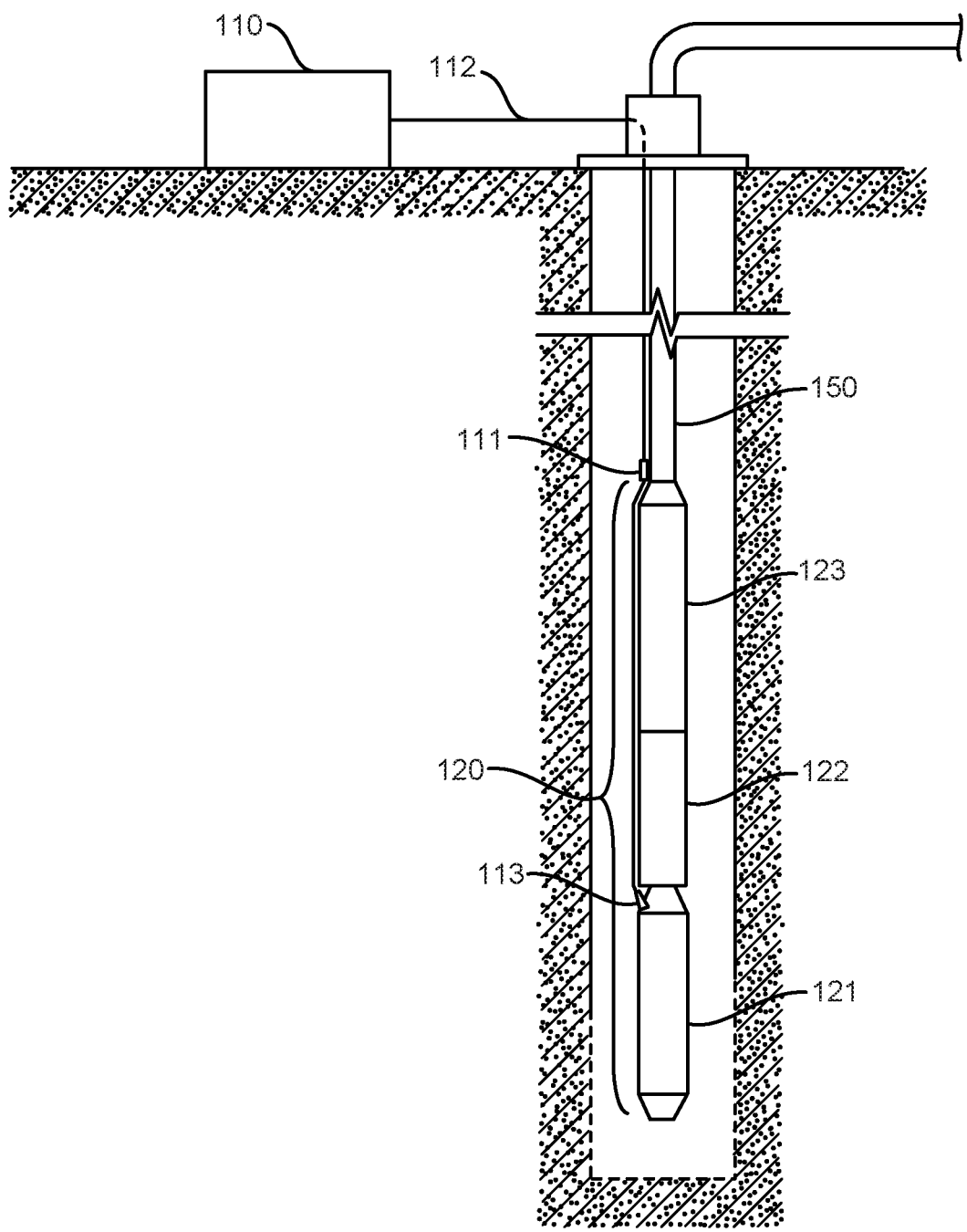
FIG. 1 is a diagram illustrating an exemplary ESP system in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention. Further, the drawings may not be to scale, and may exaggerate one or more components in order to facilitate an understanding of the various features described herein. While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims. Further, the drawings may not be to scale, and may exaggerate one or more components in order to facilitate an understanding of the various features described herein.

DESCRIPTION

As described herein, various embodiments of the invention comprise systems and methods for providing seals in a pothead connection to reduce the number of failure points at which the connection may develop leaks.

Referring to FIG. 1, a diagram illustrating an exemplary system in accordance with one embodiment of the present invention is shown. In this embodiment, an ESP system is installed in a well for the purpose of producing oil, gas or other fluids. An ESP 120 is coupled to the end of tubing string 150, and the ESP and tubing string are lowered into the wellbore to position the ESP in a producing portion of the well (as indicated by the dashed lines at the bottom of the wellbore). Surface equipment that includes a drive system 110 is positioned at the surface of the well. Drive system 110 is coupled to ESP 120 by power cable 112, which runs down the wellbore along tubing string 150. Tubing string 150 and power cable 112 may range from less than one thousand feet in a shallow well, to many thousands of feet in a deeper well.

ESP 120 includes a motor section 121, seal section 122, and pump section 123. ESP 120 may include various other components which will not be described in detail here because they are well known in the art and are not important to a discussion of the invention. Motor section 121 is operated to drive pump section 123, thereby pumping the oil or other fluid through the tubing string and out of the well. Drive system 110 produces power (e.g., three-phase AC power) that is suitable to drive motor section 121. This output power is provided to motor section 121 via power cable 112.

Power cable 112 may, for example, include two components: a primary cable component and a motor lead extension component. The primary cable extends downward along the tubing string from the drive unit at the surface of the well to a point near the ESP. At this point (typically 10-50 feet above the ESP), the primary cable is connected to the motor lead extension by a splice 111. The motor lead extension extends from the primary cable to the motor, and is connected to the motor by a connector 113, which may be referred to as a "pothead". At the pothead, the electrical conductors of the motor lead extension are coupled to the internal wiring of the motor.

The primary cable typically has three conductors to carry three-phase power to the motor. Each conductor has one or more layers of electrical insulation. The conductors may be positioned side-by-side to form a flat cable, or they may be positioned adjacent to each other (i.e., 120 degrees apart) to form a round cable. An elastomeric coating may be provided to encase the three conductors, and a metal layer may be provided over the elastomeric layer to protect the insulated conductors.

The motor lead extension is coupled to the primary cable, normally by splicing the respective conductors together. The conductors of the motor lead extension have one or more layers of electrical insulation and are usually encased in an elastomeric layer. The conductors are typically positioned side-by-side in a flat configuration, and the conductors of the motor lead extension may be smaller than the conductors of the primary cable to allow the motor lead extension to fit more easily between the ESP and the well casing. A metal layer may be provided over the elastomeric layer to protect the insulated conductors.

The motor lead extension is coupled to the primary cable, normally by splicing the respective conductors together. This splice may be achieved by coupling a splice connector between the end of each of the conductors of the primary cable and the corresponding conductor of the motor lead extension. Thus, three splice connectors would be used to couple the three conductors of the primary cable to the three conductors of the motor lead extension. At the other end of the motor lead extension, each of the conductors of the motor lead extension is connected to a corresponding terminal in the pothead connector. The pothead is secured to the motor housing with its terminals connected to complementary terminals of the motor.

Figure 2:
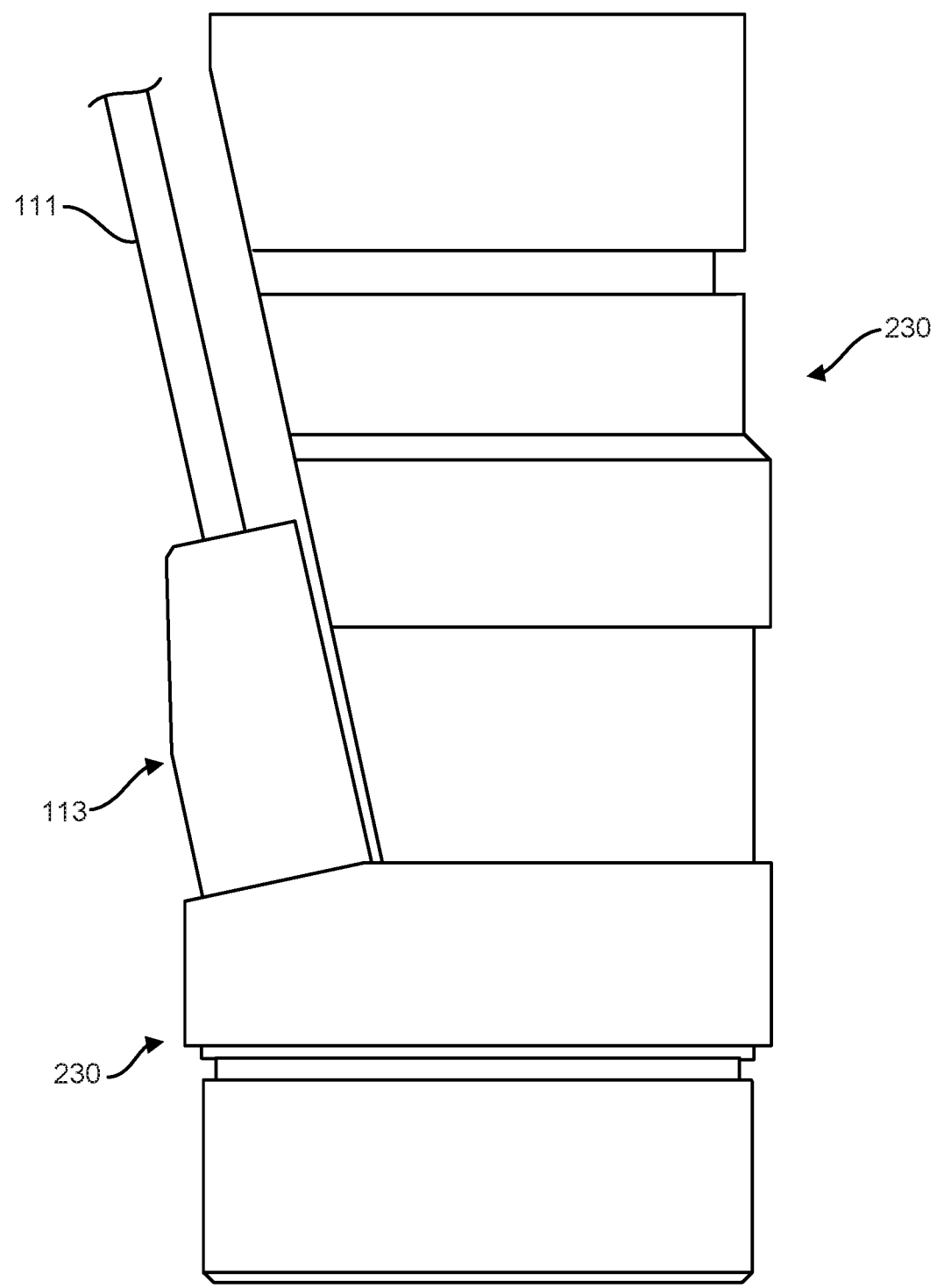
FIG. 2 is a diagram illustrating a pothead connector installed at the top of an ESP motor housing in accordance with one embodiment.

Referring to FIG. 2, a diagram illustrating a pothead connector installed at the top of an ESP motor housing is shown. In this embodiment, a motor lead extension 111 is coupled to pothead connector 113, which is secured to motor head 230. The motor head forms the upper part of the housing of the motor, and references herein to the motor head and the motor housing may be used interchangeably. As noted above, motor lead extension 111 typically has three conductors which carry three-phase power to the motor. Each electrical conductor in this case is surrounded by several outer layers. The conductor is encased in a layer of electrical insulation, and layers of elastomeric material and armor (metal sheathing) are commonly provided to protect the conductors and prevent damage to the motor lead extension (e.g., when the motor is installed in the well).

Motor lead extension 111 passes through an upper or lead end of pothead connector 113 and into a housing of the connector. The terminal end of the conductor is connected to a conductive terminal which is positioned at a lower or motor end of the pothead connector. This terminal is configured to be coupled to a corresponding terminal installed in an insulating block in motor head 230. In one embodiment, the terminal in the pothead is female and the terminal in the motor head is male, although other configurations are possible. The terminal in the motor head is electrically coupled to the internal wiring of the motor.

Figure 3:
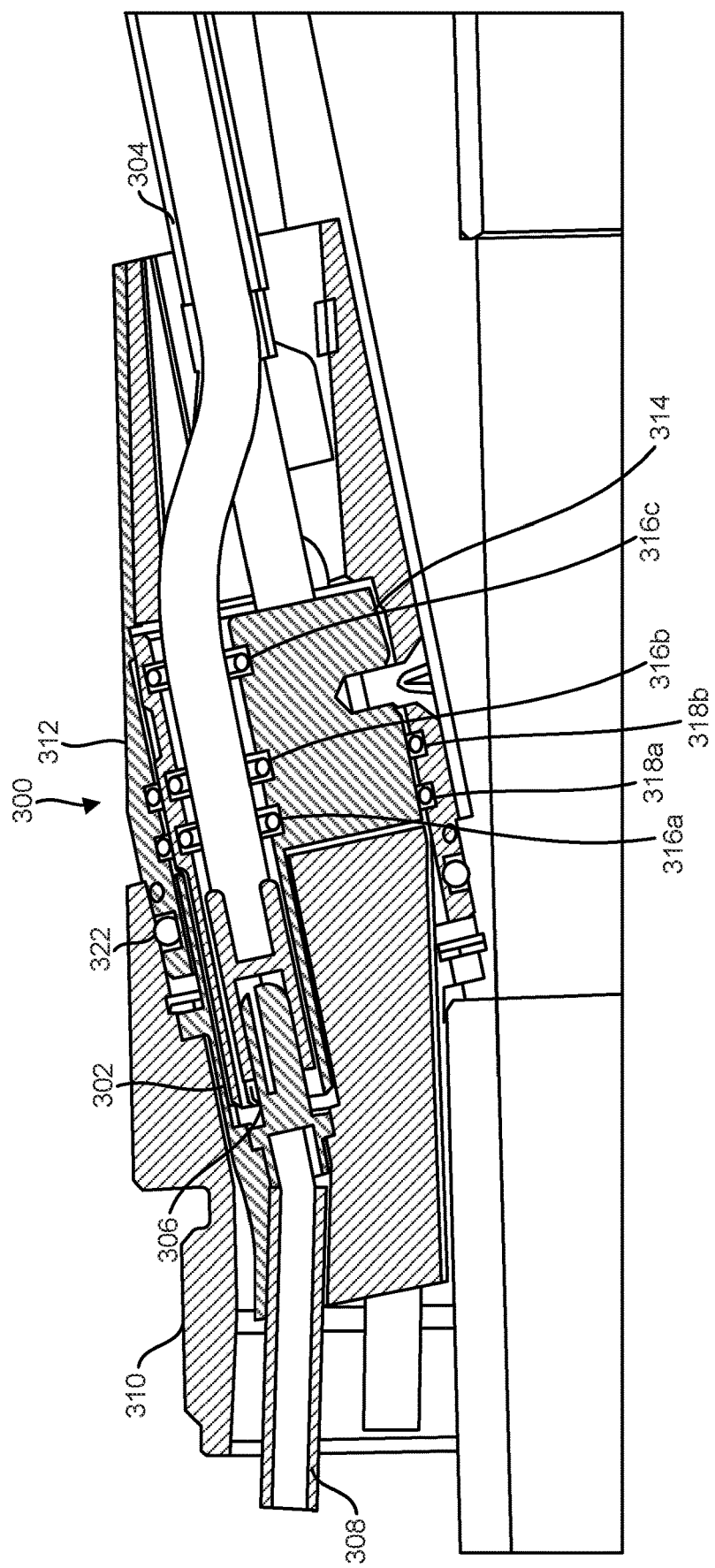
FIG. 3 is a diagram illustrating a cross-sectional view of a prior art pothead connector.

It may be helpful in understanding the invention to describe the structure of a prior art pothead connector. Referring to FIG. 3, a cross-sectional view of a prior art pothead connector is shown. Connector 300 is installed in a port of motor head 310. The connector couples a female terminal 302 at the end of conductor 304 of a motor lead extension to a male terminal 306 at the end of motor lead conductor 308 and thereby allows power to be provided to the motor.

It can be seen in the figure that connector 300 has a housing or shell 312 that contains an insulating block 314. Insulating block 314 is secured within shell 312 and seals 318 are positioned between the insulating block and the shell to prevent fluid from leaking between the insulating block and the shell. Conductor 304 passes through insulating block 314, and seals 316 are provided to prevent fluid from passing between the conductor and the insulating block. A seal 322 is located between shell 312 and motor head 310 to prevent fluid from leaking between the shell and the motor head.

The seals that are used at a given point in the present designs may be of any suitable type known in the industry. For instance, the seals may be simple O-rings or football seals made of flexible polymeric materials, or they may be manufactured from metals that are deformable to form tight seals against the pothead components and motor head. It should be noted that, despite the use of known types of seals and seal materials within the present embodiments, the configuration of the pothead connection itself and the arrangement of the seals as disclosed in these embodiments was not known prior to this disclosure.

The two sets of seals inside the pothead connector and the seal between the pothead and the motor head prevent fluids from external to the motor from leaking through the pothead connection and into the motor. Because there are three different points at which the pothead connection must be sealed, there are three potential points of failure. If there is a failure at any one of these three points, well fluids exterior to the motor will leak into the motor, potentially affecting the operation of the motor or even causing the motor to fail.

Figure 4:
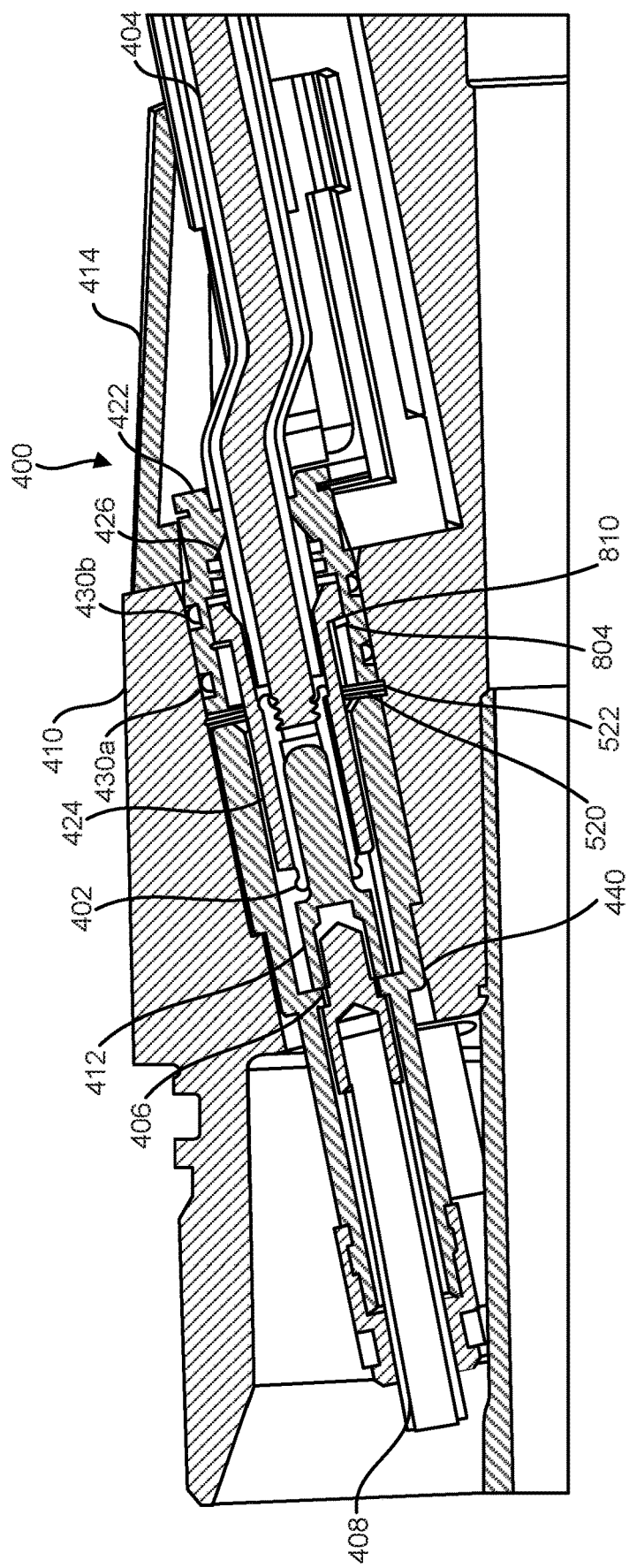
FIG. 4 is a diagram illustrating a cross-sectional view of a pothead connector in accordance with an exemplary embodiment.

Referring to FIG. 4, a cross-sectional view of a pothead connector in accordance with an exemplary embodiment of the invention is shown. In this embodiment, a pothead connector 400 is secured to a motor head 410. Like the embodiment of FIG. 3, a motor lead extension conductor 404 is secured to a first terminal 402, which is coupled via a second terminal 412 to a motor lead conductor 408. The connection, however, is made with a different structure that requires fewer seals, and consequently fewer points at which failure may occur.

Pothead connector 400 has a housing or shell 414 in which a set of motor lead extensions are secured. Although only one of the motor lead extension conductors (404) is shown, this embodiment is configured to carry three phase power, so it includes three conductors, each of which is secured to a corresponding sealing assembly as described in more detail below. It should be noted that the motor head is configured with a corresponding number of mating terminals (in this case three).

In the embodiment of FIG. 4, the motor lead extension extends into pothead connector housing 414, and through a rear insulator 422 having a generally cylindrical body. The end of conductor 404 is threaded into a female terminal 402 to secure it to the terminal. A football seal 426 is placed over the motor lead extension so that it is positioned between the motor lead extension and the rear insulator. A front insulator 424 is also placed over the motor lead extension and is secured to rear insulator 422 so that football seal 426 is compressed between them. The longitudinal compression of football seal 426 causes the seal to expand radially so that it is pressed against rear insulator 422 and an insulation layer 405 on conductor 404, thereby forming a seal between them. The front and rear insulators, football seal and female terminal form a sealing assembly at the end of the motor lead extension conductor.

It should be noted that, although this embodiment uses an insulating material to form the cylindrical body of rear insulator 422, alternative embodiments may use a conductive material for this component since it contacts the layer of insulation around the conductor, but does not contact the conductive material of conductor 404 itself. Front insulator 424, which contacts terminal 402, is positioned between the terminal and the rear insulator. Rear insulator 422 may therefore be referred to more generally as a sealing body or a cylindrical sealing body, as the two seals are formed against this component (i.e., the seal between the cylindrical sealing body 422 and the conductor, and the seal between the cylindrical sealing body 422 and the motor head).

It should be noted that, for the purposes of this disclosure, the term "conductor" is used to refer to a conductor of the type commonly used in power cables for equipment such as an ESP motor. Such conductors commonly have a layer of electrical insulation that covers the electrically conductive material (e.g., copper). It should be understood that, at the end of the conductor which is coupled to the electrical terminal, the electrically insulative layer is removed to expose the conductive material and to allow the electrical connection of the conductor to the terminal. The remainder of the conductor is covered by the layer of electrical insulation, and it is this covered portion against which the seal is made by the football seal.

The sealing assembly fits within a port in the motor head (e.g., a bore through the motor head). A pair of seals 430 (e.g., O-rings) are positioned at the circumference of the sealing assembly to provide a seal between the sealing assembly and the motor head. Since the rear insulator is sealed directly against the motor head (i.e., the seal is in contact with both the rear insulator and the motor head), there is no need for a seal between the pothead connector housing (414) and the motor head. Consequently, there are only two places at which the pothead connection is sealed—between the conductor and the rear insulator, and between the rear insulator and the motor head.

When the pothead is installed, the female terminal 402 the sealing assembly mates with the male terminal 412 which is part of an insert assembly within the port in the motor head 410. Male terminal 412 is connected to crimp connection 406, which is in turn connected to motor lead 408. Because seals are provided in the sealing assembly (between the motor lead extension 404 and rear insulator 422, and between rear insulator 422 and motor head 410), there is no need to provide seals around the insert assembly in the motor head port.

Figure 5:
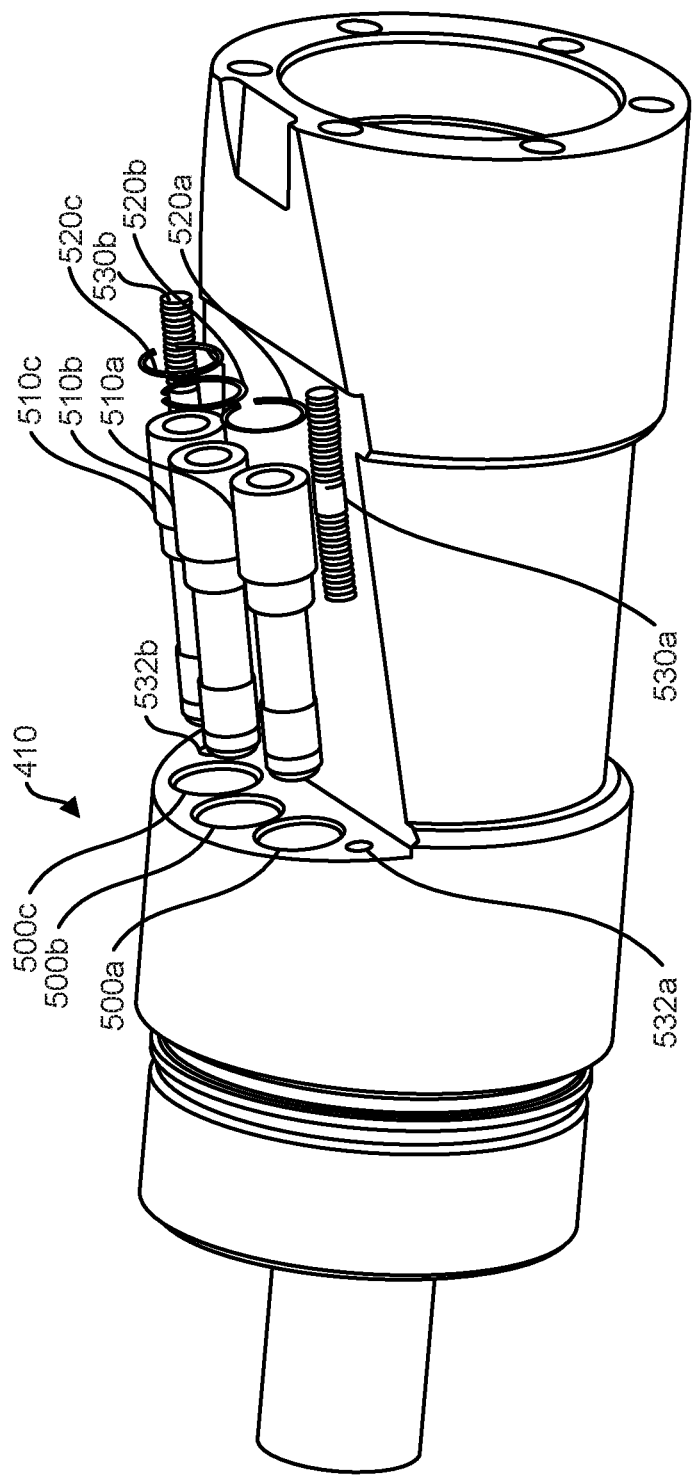
FIG. 5 is an exploded view of a motor head assembly in accordance with an exemplary embodiment.

Referring to FIG. 5, a partially exploded view of the motor head assembly is provided to show the related components of the connection. As depicted in this figure, motor head 410 has three ports (500) into which corresponding insert assemblies (510) are positioned. Each insert assembly, after being positioned in the corresponding port, is secured by a corresponding lock ring (520). The lock ring is installed in a compressed state, and expands outward into a corresponding groove (522) in the inner wall of the motor head port. A pair of threaded studs (530) are installed in corresponding stud holes (532) in the motor head. The studs are used to secure the housing of the pothead connector to the motor head.

Figure 6:
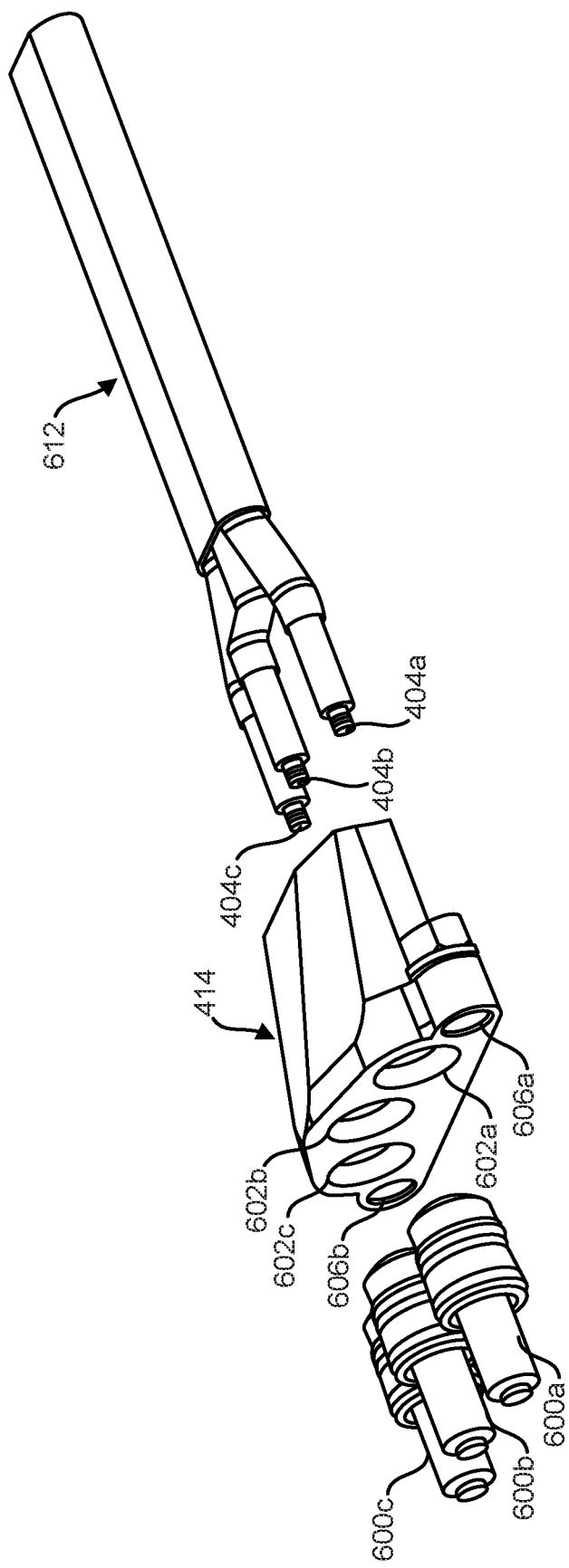
FIG. 6 is an exploded view of a pothead connector assembly in accordance with an exemplary embodiment.

Referring to FIG. 6, a partially exploded view of the pothead connector assembly is shown. This figure separately depicts the pothead housing 414, the sealing assemblies (600) and the conductors (404). As shown in the figure, power cable 612 has three conductors (404), each of which carries a separate phase of the three-phase power which will be provided to the motor. A separate sealing assembly (600) is provided for each of the three conductors. Each sealing assembly is positioned in a corresponding port (602) within the pothead housing 414. After each sealing assembly (600) is inserted into the corresponding port (602) of pothead housing 414, the corresponding conductor is secured to the sealing assembly by a threaded connection (internal threads on female terminal 402 which mate with external threads at the end of conductor 404). Stud holes 606 are provided in pothead housing 414 so that when the pothead connector is installed, studs 530 extend through holes 606. Nuts 608 are threaded onto the studs to secure pothead housing 414 to the motor head 410.

Referring to FIG. 7, an exploded view of one of the insulated insert assemblies that fits within a corresponding port of the motor head is shown. As depicted in this figure, the assembly includes a male terminal 402 that fits within a bore of the insulator 440 from its front end. A crimp connection 406 (which is crimped onto the end of a corresponding motor lead which is not shown in the figure) fits into the bore of insulator 440 from its rear end. An internal shoulder in the bore of the insulator prevents both terminal 402 and crimp connection 406 from moving all the way through the bore. When the threaded forward end of crimp connection 406 is screwed into the rear end of terminal 402, each of these components is secured against the internal shoulder within insulator 440. A dust boot 710 is provided at the rear end of the assembly to provide a seal between the motor lead and insulator 440. A boot ring 712 is placed over dust boot 710 to hold it securely against the motor lead.

Referring to FIG. 8, an exploded view of one of the sealing assemblies of the pothead connector is shown. In the sealing assembly, a motor lead extension (which is not shown in the figure) a rear insulator is extended through the bore of a rear insulator 422. A pair of O-ring seals 430 are seated in grooves around the circumference of the rear insulator. The motor lead extension is extended through a football seal 426 and is threaded into a female terminal 402. The female terminal is inserted into a bore of the front insulator 424, and a terminal retaining ring 802 is placed in a groove on the front end of the terminal to hold the terminal in place within the insulator. The front insulator 424 and terminal 402 are then placed in the bore of the rear insulator 422 and pushed toward the rear insulator. Each of the front and rear insulators has a tapered face that contacts the football seal and compresses the seal axially (in the direction of axis 401), forcing it radially inward against the motor lead extension and radially outward against the inner wall of the rear insulator. The inner wall of the rear insulator has a pair of grooves into which the football seal can expand. A front insulator retaining ring 804 is positioned around front insulator 424 against a forward-facing shoulder 808. When the front insulator has been pushed far enough into the rear insulator, retaining ring 804 is seated in a groove 810 in the inner wall of the rear insulator, thereby locking the front insulator in place.

It should be noted that the pothead connection described above may be implemented using pothead connectors of various types. Conventionally, when a pothead connector is assembled, the components internal to the pothead housing are assembled and positioned within the housing and the interior of the housing around the cable is filled with epoxy. This is done in order to secure the cable and to help prevent swelling of the insulation around the cable. In some embodiments of the invention, however, the epoxy is not necessary. When a non-swelling or swell-resistant insulation is provided on the cable, it is not necessary use epoxy to prevent swelling, so a pothead housing that secures the cable using a clamping mechanism can be used. Referring to FIGS. 9A and 9B, an embodiment that uses a clamped two-piece pothead housing is shown. FIG. 9A shows a cross-sectional view of the pothead connector, while FIG. 9B shows an external view of the pothead connector with the two pieces of the housing disassembled.

The new pothead housing is a two-piece housing in which the cable is clamped between the two pieces. In this embodiment, the sealing assemblies 950 of the connector are threaded into a first housing component 910. These assemblies could alternatively be secured to housing component 910 using lock rings or other means. A cable 930 that is coupled to each of the sealing assemblies extends from the assemblies to an upper end of the pothead housing (at the right side of the figure). A second housing component 920 is provided on the opposing side of the cable, and bolts 940 are used to secure the two housing components to each other with the cable clamped between them. Each of housing components 910 and 920 has teeth (912, 922) on their respective surfaces that are clamped against a protective outer layer 932 of cable 930 in order to prevent the cable from slipping between the clamped housing components. This embodiment may provide several advantages over embodiments in which epoxy is used to secure the cable. For instance, since the two housing components are bolted together, the pothead housing can be disassembled, allowing these components and the internal components of the pothead connector to be reclaimed. This is not possible in a pothead connector in which epoxy has been used to secure the cable. Another advantage is that the pothead connector can be opened for inspection, which is not possible in a connector that is filled with epoxy. Yet another advantage is that the pothead connector can be assembled much more quickly than a connector that is filled with epoxy, as it is necessary in an epoxy-filled connector to wait (typically for several hours) for the epoxy to cure.

Thus, a number of inventive embodiments are disclosed. One embodiment comprises a pothead connection having a pothead housing and a motor housing, wherein the pothead housing has one or more sealing assemblies secured to it, wherein each of the sealing assemblies is secured to a corresponding conductor, includes a sealing body that is directly sealed against the conductor, and includes a pothead terminal that is electrically connected to the conductor; and a motor housing having one or more bores therethrough, wherein each bore contains a motor housing terminal which is configured to be electrically connected to a corresponding one of the pothead terminals; wherein in each of the sealing assemblies of the pothead connector, the corresponding insulator is sealed directly against the motor housing. In one embodiment, the sealing body is a generally cylindrical insulator that is sealed directly against the conductor and against the motor head. In one embodiment, the pothead housing is in fluid communication with well fluids external to the motor housing. In one embodiment, each conductor comprises a conductor of a three phase power cable, wherein the pothead connector has three sealing assemblies, and wherein each of the sealing assemblies is identical. In one embodiment, each of the sealing assemblies comprises a football seal that directly contacts the conductor and the insulator and forms a fluid seal between the conductor and the insulator. Numerous alternative embodiments are also possible.

The various embodiments of the pothead connection may have a number of variations. For instance, the insulators in the insert assemblies and sealing assemblies may be made of PEEK (polyether ether ketone) or any other insulative material that has sufficient mechanical strength and insulative properties. The motor leads and motor lead extensions cable may be insulated with EPDM (ethylene propylene diene monomer), PFA (perfluoroalkoxy), or any other insulator or combination of insulators. The rear insulators may be made of an insulative material such as PEEK, but may alternatively be made of a conductive material such as steel. The cable with the motor lead extensions may be jacketed with lead or another metal, such as stainless steel.

The internal seal to the cable may be a football seal or an alternative sealing mechanism, such as O-rings or lip seals, or a metal seal directly to the lead jacket. In the case of a stainless jacket, the rear insulator may also seal directly to the lead jacket. Seals other than dual O-rings may be used for the seal between the rear insulator and the motor head, including a single O-ring, boot seals or a direct metal-to-metal seal.

The sealing assemblies may be retained in the pothead housing using retaining rings as shown in the figures, or using alternative means such as a threaded connection. Similarly, the front insulator of the sealing assembly may be secured in the rear insulator using an alternative means, such as a screw thread or a bayonet plug. The terminal may be anchored to the front insulator using C-clips or other means, such as a screw-together terminal. The cable may be anchored in the pothead housing using a material such as epoxy, or the pothead housing may be internally shaped to guide and anchor the conductors. The motor head insulating inserts may be anchored into the motor head using lock rings, screw connections, bayonet connections, or other means. The terminals can be connected to the motor leads and motor lead extensions by any suitable means, such as being soldered, crimped, welded, or otherwise attached. Although dust boots are used in the embodiments described above, they may be omitted in alternative embodiments.

The pothead housing may be one piece, or multiple pieces that are secured together. The motor head may have additional features, such as pressure test ports that allow pressurization between the dual O-rings to test the connection and seals between the Insulated blocks and head, where the ports prevent fluid loss during plug-in, but disengage when the pothead is engaged.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the particular embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the described embodiments.

What is claimed is:

1. A pothead connection comprising:
   a pothead connector including a pothead housing, wherein the pothead housing is open to well fluids, wherein the pothead housing has one or more sealing assemblies secured thereto,
      wherein each of the sealing assemblies is secured to a corresponding cable;
      wherein each of the sealing assemblies includes a sealing body that is directly sealed against the corresponding cable, and
      wherein each of the sealing assemblies includes a pothead terminal that is electrically connected to a conductor of the corresponding cable;
   a motor housing having one or more ports therethrough, wherein each port has a corresponding motor housing terminal positioned therein which is configured to be electrically connected to a corresponding one of the pothead terminals;
   wherein each of the sealing bodies is sealed directly against the motor housing.

2. The pothead connection of claim 1, further comprising one or more motor housing insert assemblies, wherein each of the insert assemblies is installed in a corresponding one of the one or more ports, wherein the corresponding motor housing terminal is secured within the insert assembly.

3. The pothead connection of claim 2, wherein each of the one or more motor housing insert assemblies comprises an insert insulator, wherein when the motor housing insert assembly is installed in the corresponding one of the one or more ports, the insert insulator is positioned between the corresponding motor housing terminal and the motor housing and electrically insulates the corresponding motor housing terminal from the motor housing.

4. The pothead connection of claim 1, wherein the sealing body comprises a generally cylindrical insulator that is sealed directly against the cable and against the motor housing.

5. The pothead connection of claim 1, wherein the sealing body comprises a generally cylindrical electrically conductive body that is sealed directly against an outer layer of the cable which is electrically insulated from the conductor of the cable, wherein the electrically conductive body is further sealed directly against the motor housing.

6. The pothead connection of claim 1, wherein an interior of the pothead housing is in fluid communication with well fluids external to the motor housing.

7. The pothead connection of claim 1, wherein each cable comprises a component of a three phase power cable, wherein the pothead connector has three sealing assemblies, and wherein each of the sealing assemblies is identical.

8. The pothead connection of claim 1, wherein each of the sealing assemblies is a separate assembly, and wherein each of the sealing assemblies is installed in a corresponding, separate port in the motor housing.

9. The pothead connection of claim 1, wherein each of the sealing assemblies includes: a front insulator that is threadably connected to the sealing body, wherein the pothead terminal of the sealing assembly is positioned within the front insulator; and a football seal that directly contacts the cable and the sealing body and forms a fluid seal between the cable and the sealing body, wherein the football seal is positioned between opposing tapered faces of the front insulator and the sealing body and wherein the tapered faces of the front insulator and the sealing body compress the football seal axially.

10. A system for connecting motor lead extensions to windings in an electric submersible pump (ESP) motor, the system comprising:
    a pothead connector coupled to one or more motor lead extension cables, the pothead connector including
       a pothead housing, wherein the pothead housing is open to well fluids, wherein the pothead housing has one or more sealing assemblies secured thereto, wherein each of the sealing assemblies is secured to a corresponding cable,
          wherein each of the sealing assemblies includes a sealing body that is directly sealed against the corresponding cable, and
          wherein each of the sealing assemblies includes a pothead terminal that is electrically connected to a conductor of the corresponding cable;
    an ESP motor including
       a motor housing having one or more ports therethrough,
          wherein each port has a corresponding motor housing terminal positioned therein,
          wherein each of the motor housing terminals is electrically connected to one or more motor windings, and
          wherein each of the motor housing terminals is configured to be electrically connected to a corresponding one of the pothead terminals;
    wherein when the pothead connector is installed on the motor housing, the sealing body of each of the sealing assemblies of the pothead connector is sealed directly against the motor housing, thereby preventing fluid communication between an exterior of the motor housing and an interior of the motor housing.

11. The system of claim 10, further comprising one or more motor housing insert assemblies, wherein each of the insert assemblies is installed in a corresponding one of the one or more ports, wherein the corresponding motor housing terminal is secured within the insert assembly.

12. The system of claim 11, wherein each of the one or more motor housing insert assemblies comprises an insert insulator, wherein when the motor housing insert assembly is installed in the corresponding one of the one or more ports, the insert insulator is positioned between the corresponding motor housing terminal and the motor housing and electrically insulates the corresponding motor housing terminal from the motor housing.

13. The system of claim 10, wherein an interior of the pothead housing is in fluid communication with well fluids external to the motor housing.

14. The system of claim 10, wherein each of the sealing assemblies is a separate assembly, and wherein each of the sealing assemblies is installed in a corresponding, separate port in the motor housing.

15. The system of claim 10, each of the sealing assemblies includes: a front insulator that is threadably connected to the sealing body, wherein the pothead terminal of the sealing assembly is positioned within the front insulator; and a football seal that directly contacts the cable and the sealing body and forms a fluid seal between the cable and the sealing body, wherein the football seal is positioned between opposing tapered faces of the front insulator and the sealing body and wherein the tapered faces of the front insulator and the sealing body compress the football seal axially.

* * * * *